United States Patent [19]
Ko et al.

[11] Patent Number: 5,733,441
[45] Date of Patent: Mar. 31, 1998

[54] PRE-WET SYSTEM FOR A FILTER

[75] Inventors: Chi-Yin Ko, Hsinchu; Yu-Min Deng, Tao-Yuan Hsien; Shing-Sheng Yang; Hai Chih, both of Hsinchu, all of Taiwan

[73] Assignee: United Microelectronics Corporation, Hsinchu, Taiwan

[21] Appl. No.: 670,531

[22] Filed: Jun. 27, 1996

[51] Int. Cl.$^6$ ................................................. B01D 17/12
[52] U.S. Cl. ........................... 210/90; 73/38; 73/40; 210/167; 210/188; 134/111; 134/902
[58] Field of Search .................... 210/90, 97, 143, 210/167, 195.1, 409, 416.1, 797, 500.31, 321.69, 500.36, 636, 741; 134/56 R, 109–111, 902; 264/39, 41, 48; 425/445, 446, 474; 73/38, 40

[56] References Cited

U.S. PATENT DOCUMENTS

| | | | |
|---|---|---|---|
| 3,276,458 | 10/1966 | Iversen et al. | 134/111 |
| 3,999,564 | 12/1976 | Pesek | 134/111 |
| 4,804,464 | 2/1989 | Schevey | 210/195.1 |
| 4,872,974 | 10/1989 | Hirayama et al. | 210/90 |
| 4,881,176 | 11/1989 | Kononov | 73/38 |
| 5,049,264 | 9/1991 | Rosnack et al. | 210/167 |
| 5,167,806 | 12/1992 | Wang et al. | 210/195.1 |
| 5,190,065 | 3/1993 | Kovac et al. | 134/111 |
| 5,507,959 | 4/1996 | Glick | 73/38 |

*Primary Examiner*—Joseph W. Drodge
*Attorney, Agent, or Firm*—Bacon & Thomas

[57] ABSTRACT

The present invention is a prewet system for a filter. The present invention includes a power controller. A first container is used for storing iso-propyl alcohol liquid. An air pump is connected to the first container via a liquid pipe. The air pump is utilized for sucking the iso-propyl alcohol from the first container and driving the iso-propyl alcohol liquid to flow in the prewet system. An impurity filter is connected to the air pump via a liquid pipe, which is useful for filtering out impurities of the iso-propyl alcohol liquid. A second container is connected to the impurity filter for holding a filter. Between the filter and the second container is a pressure detector for detecting the liquid pressure inside the pipe. The prewet system provides a better prewet effect than the conventional one.

17 Claims, 3 Drawing Sheets

5,733,441

PRE-WET SYSTEM FOR A FILTER

FIELD OF THE INVENTION

The present invention relates to a prewet system, and more particularly to a pre-wet system for soaking a filter which is utilized in semiconductor equipment.

DESCRIPTION OF THE PRIOR ART

The dimensions of the semiconductor devices are scaled down caused by the improvement of the integrated circuit technology. Devices and interconnections are manufactured on a chip about 2 $cm^2$ or less in area. During the fabrication of semiconductor process, acid such as $H_2SO_4$ or HF is often utilized to clean wafers. In addition, the acid also serves as an etchant in the etching process. For example, silicon etches that are nonselective with regard to crystallographic orientation are primarily based on HF—$HNO_3$—$H_2O$ mixtures. HF in various dilutions in water and often buffered with ammonium fluoride which is the standard silicon dioxide wet etchant. Silicon nitride can be wet etched with either HF or with hot phosphoric acid. A lot of residues of etched layer are generated in the acid solution during the etching process. Therefore, a filter is needed to filter out the residues in the acid solution after the wet etching process or after the step of cleaning wafer. The filter is typically set in a semiconductor equipment. The filter has to be dismantled for removing the residues in the filter. After the residues are removed, then the filter will be set up in the equipment again. A procedure called pre-wet is needed before the filter is setup.

The filter is made of a kind of polymer called fluorinated resin (PTFE) and its surface tension is 18.5 $dyne/cm^2$, while the surface tension of water is about 70 $dyne/cm^2$. Since the difference of the surface tension between the fluorinated resin and the water is too large, the water cannot be used as the pre-wet liquid. An iso-propyl alcohol has a surface tension about 17 $dyne/cm^2$. Therefore, the iso-propyl alcohol is more suitable than the water as the pre-wet liquid for the fluorinated resin filter.

A filter that is used in semiconductor equipment for filtering out residues is illustrated in FIG. 1. An inlet (label 1) and outlet (label 2) are connected to an equipment. In practicing this system, acid flows into the filter via the inlet 1 and flows out the filter via outlet 2. The residues which are generated during the etching process or the step of cleaning wafer are filtered out by using the filter. A valve 3 that is set on the bottom portion of the filter is used to drain liquid out of the filter.

The filter has to be pre-wet before it is utilized to filter out the residues which are generated in semiconductor process. In the pre-wet procedure, first the inlet 1, outlet 2 and the valve 3 are blocked in order to prevent liquid from flowing out of the filter. Subsequently, the isopropyl alcohol is injected into the filter via an opening 4 until the iso-propyl alcohol flows out of the filter via an opening 5 to make sure that the filter is filled with the iso-propyl alcohol. Then both the opening 4 and the opening 5 are also blocked. In general, the iso-propyl alcohol will be drained out of the filter after soaking in it a half day or a day long. After the iso-propyl alcohol is drained out of the filter, deionized water is subsequently injected into the filter to clean the filter by repeating the aforementioned method. In other words, the inlet 1, outlet 2 and the valve 3 are blocked. Then, the deionized water is injected into the filter via the opening 4 until the deionized water flows out of the filter via an opening 5. Unfortunately, the method is normally operated by hand that is not only complicated but also not effectual, further more, the iso-propyl alcohol is directly drained out of the filter after the whole procedure, which will waste a lot of the iso-propyl alcohol.

SUMMARY OF THE INVENTION

A pre-wet system for a filter of semiconductor equipment is disclosed. The pre-wet system comprises a first container having an inlet and outlet which is used for storing iso-propyl alcohol liquid. The capacity of the first container is about 12 liters. The first container includes a first valve that is connected near to the inlet of the first container, a second valve is set near to the bottom of the first container, and a third valve is set near to the top of the first container. An air pump is connected to the outlet of the first container via a liquid pipe. The air pump is utilized for sucking the iso-propyl alcohol liquid from the first container and driving the iso-propyl alcohol liquid to flow in the pre-wet system. Filtering means is connected to the air pump via a liquid pipe, which is used for filtering out impurities in the iso-propyl alcohol liquid. A second container is connected to the filtering means for holding a filter, which includes a supporter, a fixer having a rubber belt, a bottom valve is set near to the bottom of the second container for draining the iso-propyl alcohol out of the second container, a first bellows tube is used for injecting the iso-propyl alcohol liquid into the filter, a second bellows tube is utilized to drain the iso-propyl alcohol liquid away from the filter. The capacity of the second container is about 40 liters. A pressure detector for maintaining the liquid pressure inside the pipe is provided between the filter and the second container. A third container is utilized to hold every means of the present invention.

DESCRIPTION OF THE PREFERRED EMBODIMENT

Figure 1:
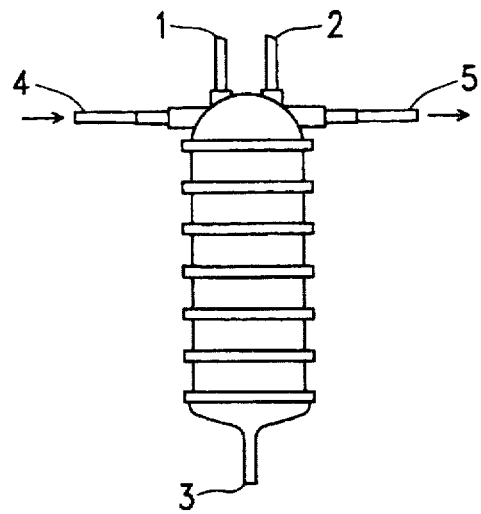
FIG. 1 is a conventional pre-wet method.
Figure 2:
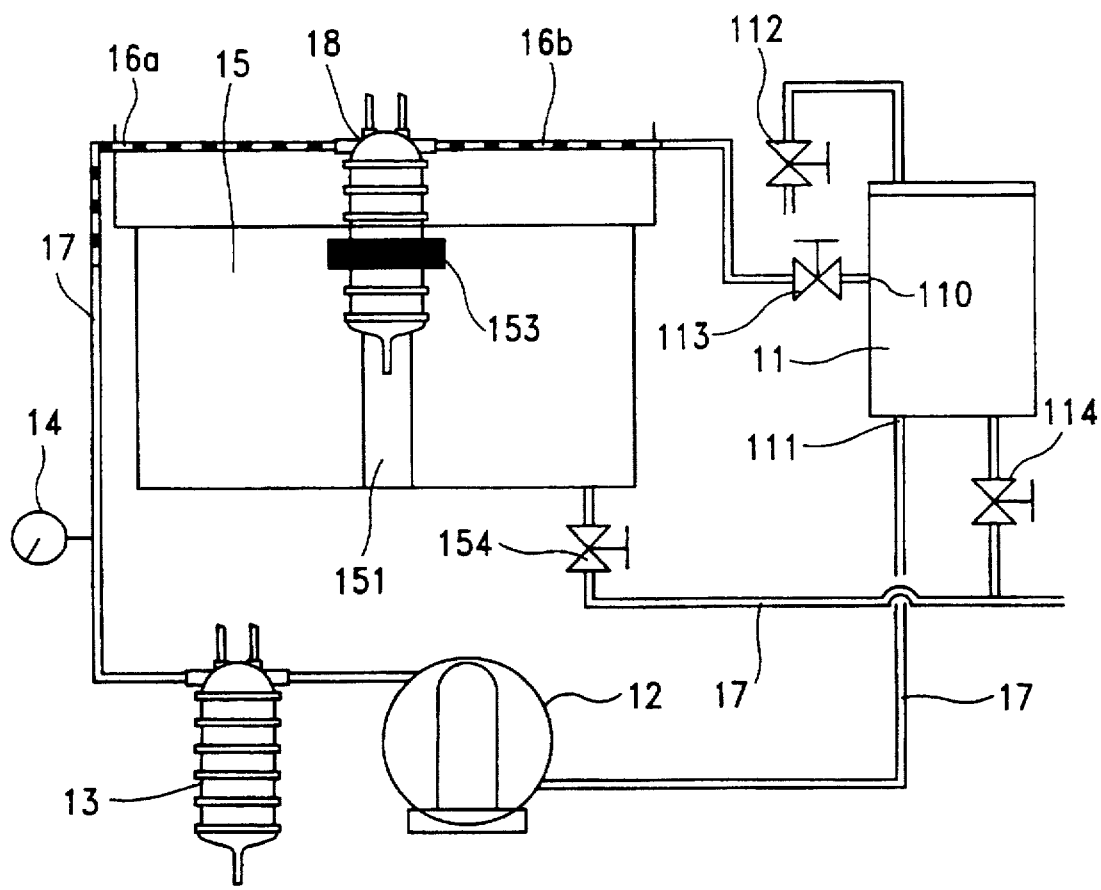
FIG. 2 is a pre-wet system for filter of the present invention.

FIGS. 2 3a, 3b, 3c show a preferred embodiment of a pre-wet system for a filter. The present invention includes a power control panel 10, a first container 11, an air pump 12, filtering means 13, a pressure detector 14, a second container 15, a first bellows tube 16a, a second bellows tube 16b, a plurality of liquid pipes 17 and a third container 20.

The first container 11 having an inlet 110 and outlet 111 is used for storing iso-propyl alcohol liquid, and the outlet 111 of the first container 11 is utilized to drain the iso-propyl alcohol liquid out of the first container 11. A first valve 113 is attached near to the inlet 110 of the first container 11 for controlling the passage of the iso-propyl alcohol liquid flowing into the first container 11, a second valve 114 is set near to the bottom of the first container 11 for the purpose of draining the iso-propyl alcohol liquid away from the pre-wet system, and a third valve 112 is set near to the top of the first container 11 for exhausting the vapor of the iso-propyl alcohol liquid out of the first container 11. The capacity of the first container 11 is about 12 liters.

An air pump 12 is connected to the outlet 111 of the first container 11 via a liquid pipe 17. The air pump 12 is utilized for sucking the iso-propyl alcohol liquid from the first container 11 and driving the iso-propyl alcohol to circulate the whole cycle in the pre-wet system.

Then a suitable filtering means 13 is connected to the outlet of the air pump 12 via a liquid pipe 17a, which is used for filtering out impurities of the iso-propyl alcohol liquid. A second container 15 is connected to the outlet of the filtering means 13 for holding a filter 18. A supporter 151 is set in the second container 15 at the bottom of the second container 15 for supporting the filter 18, a fixer 152 having a rubber belt 153 is set on one of the inner walls of the second container 15 for tying the filter 18, a bottom valve 154 is set near to the bottom of the second container 15 for draining the isopropyl alcohol liquid away from the second container 15, a first bellows tube 16a is through the side wall of the second container 15, which is used for injecting the iso-propyl alcohol liquid into the filter 18. One end of the first bellows tube 16a is connected to the filtering means 13 via a liquid pipe 17b, and the other end is connected to the filter 18. A second bellows tube 16b is utilized to drain the iso-propyl alcohol liquid out of the filter 18. The second bellows tube 16b passes through the side wall of the second container 11. One end of the second bellows tube 16b is utilized to drain the iso-propyl alcohol liquid out of the filter 18. The second bellows tube 16b passes through the side wall of the second container 11. One end of the second bellows tube is also connected to the inlet 110 of the first container 15 via liquid pipe, and the other end is connected to the filter 18. The capacity of the second container is about 40 liters. A pressure detector 14 for detecting the liquid pressure inside the pipe 17 is provided between the filtering means 13 and the second container 15. A third container 20 is utilized to hold every means of the invention, as shown in FIG. 3a, FIG. 3b and FIG. 3c.

Figure 3A:
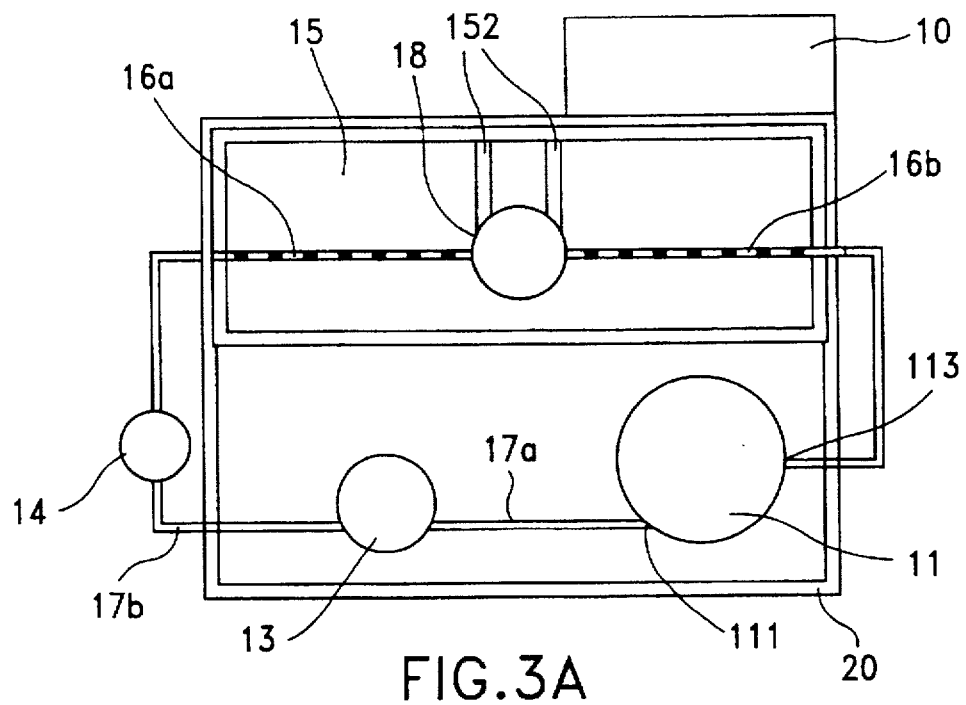
FIG. 3a is the top view of the present invention.
Figure 3B:
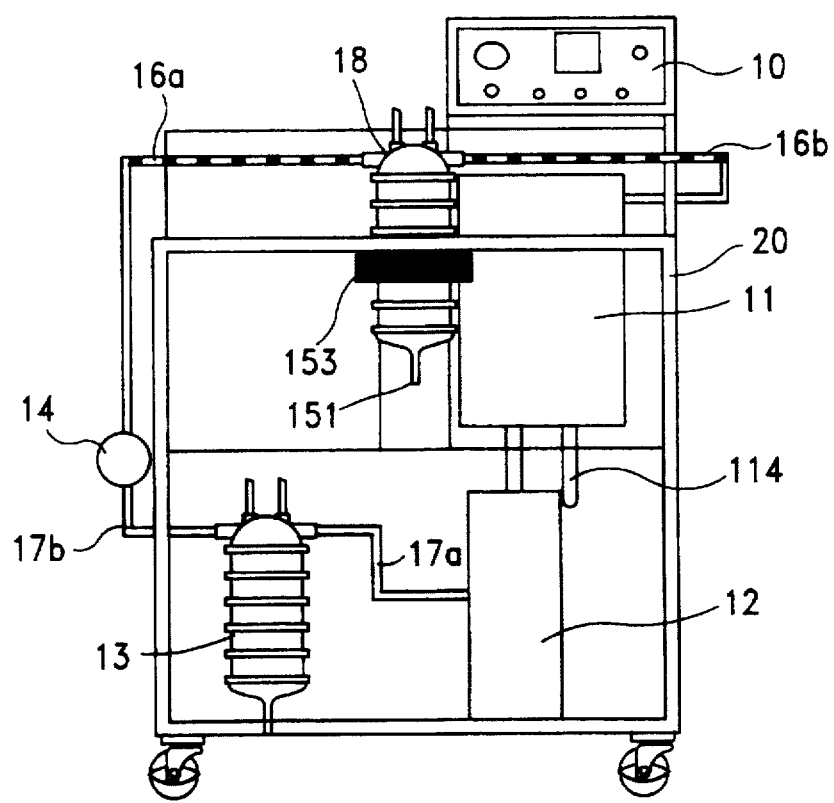
FIG. 3b shows the front view of the present invention.
Figure 3C:
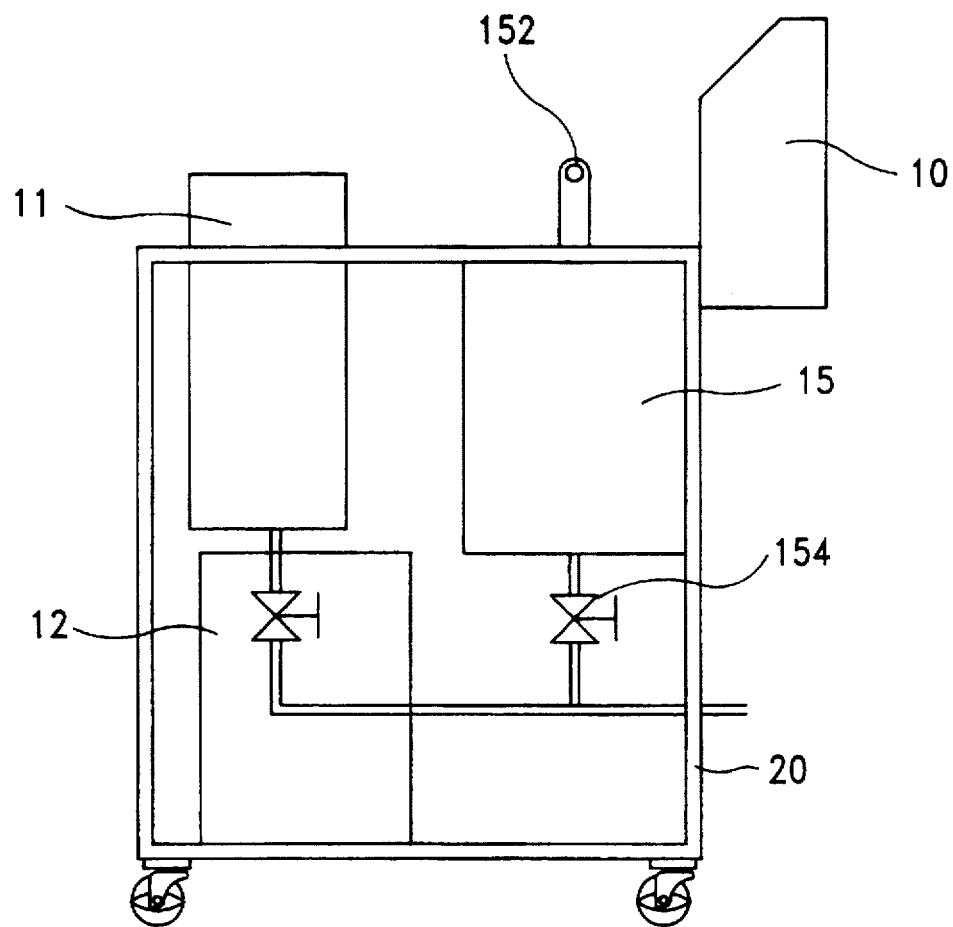
FIG. 3c shows the side view of the present invention.

FIG. 3a illustrates the second container 15 fixed on one of the inner side walls of the third container 20. The power control panel 10 as shown in FIG. 3c is attached on the outside of the side wall which is used to fix the second container 15. The first container 11 is located in the front of the second container 15, the air pump 12 is normally set under the first container 11 and the filtering means 13 is usually set near the air pump 12.

In practicing this system, when the power of the system is turned on, the SUS air pump 12 starts to suck the iso-propyl alcohol from the first container 11. Initially, the pressure detector 14 shows a higher pressure caused by a large resistance of the filter 18, and the pressure will gradually decrease after several circles. The pre-wet procedure of the system is completed when the pressure decreases; typically it needs 30—60 minutes to operate the system. In addition, if the temperature is higher than 80° C., the iso-propyl alcohol will spontaneously combust. Therefore, the power controller 10 must have an air purge to prevent the vapor of iso-propyl alcohol from diffusing into itself. And under the safety consideration of the system operation, the air pump of the present invention is a heat-free air pump.

As is understood by a person skilled in the art, the foregoing preferred embodiment of the present invention is illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A cyclic pre-wet system for a filter, said system comprising:

a first container having a first inlet and a first outlet for storing liquid, said first outlet being used for draining liquid out of said first container and said first inlet being utilized for injecting said liquid into said first container, said first container comprising (a) a first valve being attached near to said first inlet of said first container for controlling the passage of said liquid to flow into said first container, (b) a second valve being set near to the bottom of said first container for draining said liquid out of said system, (c) a third valve set near to the top of said first container for exhausting vapor of said liquid out of said first container;

cyclic driving means connected to said first outlet of said first container for sucking said liquid from said first container and driving said liquid to circulate in said system;

filtering means connected to said cyclic driving means for filtering out impurities of said liquid;

a pressure detecting means connected to said filtering means for detecting the pressure of said liquid; and a second container having a second inlet and a second outlet for holding a filter, said second inlet of said second container being connected to said filtering means, while said second outlet of said second container being connected to said first inlet of said first container.

2. The system of claim 1, wherein the capacity of said first container is about 12 liters.

3. The system of claim 1, said second container further comprising:

a supporter set at the bottom of said second container for supporting said filter;

a fixer having a rubber belt set on one of the side walls of said second container for tying said filter;

a bottom valve set near to the bottom of said second container for draining said liquid out of said second container;

a first bellows tube passing through a first side wall of said second container for injecting said liquid to said filter; and a second bellows tube passing through a second side wall of said second container for draining said liquid out of said filter.

4. The system of claim 3, wherein the capacity of said second container is about 40 liters.

5. The system of claim 1, said pre-wet system further comprising a power control panel for controlling and providing power to said system.

6. The system of claim 1, wherein said liquid is iso-propyl alcohol (IPA).

7. The system of claim 6, wherein said pre-wet system further comprising a power control panel for controlling and providing power to said system, said power control panel having air purge means for preventing the vapor of said iso-propyl alcohol from diffusing into said power control panel.

8. The system of claim 6, wherein said cyclic driving means is a heat-free air pump.

9. The system of claim 1, said pre-wet system further comprising a third container for holding said first container, said cyclic driving means, said filtering means, said pressure detecting means and said second container; said second container being fixed on a third side wall of said third container, a power control panel being attached on the outside of said third side wall, said first container being located in the front of said second container, said cyclic driving means being set under said first container and said filtering means being set at the side of said cyclic driving means.

10. A cyclic pre-wet system for a filter, said system comprising:

- a first container for storing liquid, said first container having an outlet for draining liquid out of said first container, a first inlet for injecting said liquid into said first container, a first valve attached near to said first outlet of said first container for controlling the passage of said liquid to flow into said first container, a second valve set near to the bottom of said first container for draining said liquid out of said system, and a third valve set near to the top of said first container for exhausting the vapor of said liquid out of said first container;
- cyclic driving means connected to said first outlet of said first container via a first liquid pipe for sucking said liquid from said first container and driving said liquid to circulate in said system;
- filtering means connected to said cyclic driving means via a second liquid pipe for filtering out impurities of said liquid;
- pressure detecting means connected to said filtering means for detecting the pressure of said liquid; and
- a second container having a second inlet and a second outlet for holding a filter, said second container including:
  (1) a supporter set at the bottom of said second container for supporting said filter;
  (2) a fixer having a rubber belt set on one of the inner walls of said second container for tying said filter;
  (3) a bottom valve set near to the bottom of said second container for draining said liquid out of said second container;
  (4) a first bellows tube passing through the side wall of said second container for injecting said liquid into said filter, and a first end of said first bellows tube being connected to said filtering means via a third liquid pipe and a second end of said first bellows tube being connected to said filter;
  (5) a second bellows tube passing through a second side wall of said second container for draining said liquid out of said filter, and a third end of said second bellows tube being connected to said first inlet of said first container via a fourth liquid pipe and a fourth end of said second bellows tube being connected to said filter.

11. The system of claim 10, wherein the capacity of said first container is 12 liters.

12. The system of claim 10, wherein the capacity of said first container is 40 liters.

13. The system of claim 10, wherein said pre-wet system further comprising a power control panel for controlling and providing power to said system.

14. The system of claim 10, wherein said liquid is iso-propyl alcohol(IPA).

15. The system of claim 14, wherein said pre-wet system further comprising a power control panel for controlling and providing power to said system, said power control panel having air purge means for preventing the vapor of said iso-propyl alcohol from diffusing into said power control panel.

16. The system of claim 14, wherein said cyclic driving means is a heat-free air pump.

17. The system of claim 10, wherein said pre-wet system further comprising a third container for holding said first container, said cyclic driving means, said filtering means, said pressure detecting means and said second container; said second container being fixed on a third side wall of said third container, a power control panel being attached on the outside of said third side wall, said first container being located in the front of said second container, said cyclic driving means being set under said first container and said filtering means being set at the side of said cyclic driving means.

* * * * *